(12) United States Patent
Choi et al.

(10) Patent No.: US 12,447,550 B2
(45) Date of Patent: Oct. 21, 2025

(54) ULTRASONIC WELDING SYSTEM AND POWER MODULE PACKAGE FOR POWER CONVERTING APPARATUS TO WHICH SUBSTRATE WHERE CONNECTION MEMBER IS ULTRASONIC WELDED BY USING THE SAME IS APPLIED

(71) Applicant: JMJ Korea Co., Ltd., Busan (KR)

(72) Inventors: Yun Hwa Choi, Busan (KR); Jung Min Park, Bucheon-si (KR)

(73) Assignee: JMJ Korea Co., Ltd., Busan (KR)

( * ) Notice: Subject to any disclaimer, the term of this patent is extended or adjusted under 35 U.S.C. 154(b) by 16 days.

(21) Appl. No.: 18/442,063

(22) Filed: Feb. 14, 2024

(65) Prior Publication Data

US 2025/0018498 A1  Jan. 16, 2025

(30) Foreign Application Priority Data

Jul. 11, 2023  (KR) .................. 10-2023-0089928

(51) Int. Cl.
*B23K 20/10*  (2006.01)
*B23K 37/04*  (2006.01)

(52) U.S. Cl.
CPC .............. *B23K 20/10* (2013.01); *B23K 37/04* (2013.01)

(58) Field of Classification Search
None
See application file for complete search history.

(56) References Cited

U.S. PATENT DOCUMENTS 3,357,091 A * 12/1967 Reissmueller .... H01L 21/67144
29/714
5,250,843 A * 10/1993 Eichelberger ........ H01L 23/538
257/E21.705

FOREIGN PATENT DOCUMENTS

| JP | 2002-321063 A | | 11/2002 |
| JP | 2004-047692 A | | 2/2004 |
| JP | 2009028728 A | * | 2/2009 |
| JP | 2010-046707 A | | 3/2010 |
| JP | 2012-115842 A | | 6/2012 |
| JP | 2019-051556 A | | 4/2019 |
| KR | 10-2009-0019799 A | | 2/2009 |
| KR | 20-2012-0001876 U | | 3/2012 |

(Continued)

*Primary Examiner* — Devang R Patel
(74) *Attorney, Agent, or Firm* — Park, Kim & Suh, LLC

(57) ABSTRACT

Provided is an ultrasonic welding system and a power module package for a power converting apparatus to which a substrate where connection members are ultrasonic welded by using the system is applied, wherein the ultrasonic welding system includes a waffle pack 110 on which connection members 10 to be ultrasonic welded onto a substrate 20 are arranged in a specific form, a centering aligning unit 120 which aligns and centers the connection members 10 transferred from the waffle pack 110, an ultrasonic welding part 130 which fixes the substrate 20 and ultrasonic welds the connection members 10 aligned by the centering aligning unit 120 onto the substrate 20, and a picker 140 which separately picks the connection members 10 from the waffle pack 110 to be transferred to the centering aligning unit 120 and re-picks the aligned connection members 10 from the centering aligning unit 120 to be transferred to ultrasonic welding positions on the substrate 20 fixed to the ultrasonic welding part 130, wherein the connection members 10 are aligned on a right position on the substrate 20 and are stood straight.

18 Claims, 22 Drawing Sheets

(56) References Cited

FOREIGN PATENT DOCUMENTS

| KR | 20-2012-0001877 U | 3/2012 | | |
|---|---|---|---|---|
| KR | 10-2012-0094269 A | 8/2012 | | |
| KR | 10-1619782 B1 | 5/2016 | | |
| KR | 10-2017-0118046 A | 10/2017 | | |
| KR | 10-2019-0058713 A | 5/2019 | | |
| KR | 10-2021-0065415 A | 6/2021 | | |
| KR | 20210112728 A | * | 9/2021 | |
| KR | 10-2371107 B1 | 3/2022 | | |
| KR | 10-2023-0012637 A | 1/2023 | | |
| KR | 10-2023-0015736 A | 1/2023 | | |
| WO | WO-2016167526 A1 | * | 10/2016 | ............ B23K 20/10 |

\* cited by examiner

NODAL POINT

NODAL POINT

ULTRASONIC WELDING SYSTEM AND POWER MODULE PACKAGE FOR POWER CONVERTING APPARATUS TO WHICH SUBSTRATE WHERE CONNECTION MEMBER IS ULTRASONIC WELDED BY USING THE SAME IS APPLIED

CROSS-REFERENCE TO RELATED PATENT APPLICATION

This application claims the benefit of Korean Patent Application No. 10-2023-0089928, filed on Jul. 11, 2023, in the Korean Intellectual Property Office, the disclosure of which is incorporated herein in its entirety by reference.

BACKGROUND OF THE INVENTION

1. Field of the Invention

The present invention relates to an ultrasonic welding system and a power module package for a power converting apparatus to which a substrate where connection members are ultrasonic welded by using the system is applied, and more particularly, to an ultrasonic welding system and a power module package for a power converting apparatus to which a substrate where connection members are ultrasonic welded by using the system is applied, wherein the connection members may be aligned and stood straight on a right position on the substrate without being separated or fell down and may be ultrasonic welded to the substrate.

2. Description of the Related Art

In general, soldering is used to bond semiconductor devices, spacers, and metal bridges onto a metal pattern of a semiconductor substrate. However, when bonding is performed by using soldering, the semiconductor substrate is vulnerable to physical vibration or crack, bonding quality is low so that productivity is very low, and lead or environmental pollution may be generated.

In this regard, an ultrasonic welding unit as illustrated in FIG. 1 is used to ultrasonic weld a connection member 10' onto a substrate 20'.

Meanwhile, while in ultrasonic welding, a general ultrasonic welding unit pressurizes a horn 220' in a downward direction and thereby, the connection member 10' is pressurized at a constant pressure. Here, the front end of the horn 220' is deformed in an upward direction by a fixed amount of deflection based on a deflection center point C' formed at an area where a booster 212' and the horn 220' are joined. In other words, as illustrated in FIG. 1, the horn 220' is lifted based on the deflection center point C'.

Accordingly, flatness of the connection member 10' is inclined and thereby, the whole surface area of the member 10' may not be uniformly bonded so that ultrasonic welding is not appropriately performed and thus, a bonding defect may occur.

Also, vacuum is formed in an engraved hole 221' which is formed and hollowed in a pocket tool of the horn 220' and the connection member 10' is picked up to be transferred onto the substrate 20'. However, a tolerance is generated between the size of the engraved hole 221' and the size of the connection member 10' and thereby, the connection member 10' may be separated or fell down. Accordingly, the connection member 10' may not be properly ultrasonic welded on a right position.

Therefore, there is a demand for the development of a technology that may prevent deflection of a horn so as to uniformly bond a connection member and increase quality of ultrasonic welding.

SUMMARY OF THE INVENTION

The present invention provides an ultrasonic welding system and a power module package for a power converting apparatus to which a substrate where connection members are ultrasonic welded by using the system is applied, wherein the connection members may be aligned and stood straight on a right position on the substrate without being separated or fell down and may be ultrasonic welded to the substrate.

According to an aspect of the present invention, there is provided an ultrasonic welding system including: a centering aligning unit which aligns and centers connection members to be ultrasonic welded onto a substrate; an ultrasonic welding part which ultrasonic welds and bonds the connection members aligned by the centering aligning unit onto the substrate; and a picker which picks the connection members to be transferred to the centering aligning unit and re-picks the connection members aligned by the centering aligning unit to be transferred to ultrasonic welding positions on the substrate fixed to the ultrasonic welding part.

Here, the ultrasonic welding system may further include a waffle pack on which the connection members are arranged in a specific form and the picker may separately pick the connection members from the waffle pack to be transferred to the centering aligning unit.

Here, the waffle pack may include pockets manufactured to have a fixed depth arranged thereon in a matrix form in correspondence to the form of the connection members.

Also, the centering aligning unit may include: a centering zone on which the connection member transferred by the picker is placed and fixed; a centering unit which aligns and centers the connection member on the centering zone; and a vacuum-formed hole which is formed at the middle of the centering zone to provide a negative pressure and to fix the connection member.

Here, the centering unit may include a plurality of centering jaws which is spaced apart from each other by the same interval on a concentric circle so as to stroke back and forth toward the center of the centering zone; a centering block which comprises the centering zone in the middle at the upper part thereof and guides the stroke of the centering jaws back and forth; a first cylinder which is combined to one side of the centering block and strokes each centering jaw forward; and a second cylinder which is combined to the other side of the centering block and strokes each centering jaw backwards.

Here, the number of the centering jaws may be 2 through 5.

Also, at least any one of the first cylinder and the second cylinder may include a pneumatic cylinder.

Also, the centering aligning unit may further include a blower which sprays compressed air to the connection member placed on and fixed to the centering zone.

Also, the ultrasonic welding part may include: a bonding block on which the substrate is placed on the upper part thereof; a clamp unit which fixes the substrate to the upper part of the bonding block; and an ultrasonic welding unit which ultrasonic welds the connection members placed on the substrate fixed by the clamp unit.

Here, clamp unit may further include clamps which are formed to face the upper part of the bonding block and to be lifted and descended so as to fix the substrate.

More specifically, the clamp unit may include a pair of clamps which fixes the substrate as the substrate is placed; LM guide rails which are extended in a vertical direction and each combined to the lower part of the clamp; LM guides which guide the LM guide rails to be lifted; and a third cylinder which lifts and descends the LM guides.

Here, the third cylinder may include a pneumatic cylinder.

Also, the clamp may further include pressure holes at the lower front end thereof which pressurize the upper surface of the substrate.

Also, the ultrasonic welding unit may include: a housing which covers a booster to which ultrasonic vibration transmitted from a converter is applied; and a horn which includes a pocket tool, wherein one side of the pocket tool is combined to the front end of the booster and the other side of the pocket tool is adhered to the upper surface of the connection member so that ultrasonic waves is transmitted to the connection members to be bonded.

Here, the ultrasonic welding unit may further include a deflection prevention block which is combined to the upper part of the housing and presses and supports the upper part of the horn.

More specifically, the deflection prevention block may press and support the upper part of a point where ultrasonic oscillation reaches at the least within the total length of the horn.

Also, the housing may include a positioning block combined to the upper part thereof so as to adjust the position of the deflection prevention block.

Also, the other side of the pocket tool adhered to the upper surface of the connection member may include a knurling pattern.

Also, the pocket tool may include an engraved hole having a specific structure at the lower surface thereof to which the connection member is inserted.

Here, the engraved hole may be formed and hollowed in a hexahedral form or a cylindrical form.

Here, the engraved hole may include one or more holes penetrated and formed thereon and the holes may vacuum adsorb one surface of the connection member by a negative pressure.

Also, the engraved hole may include a knurling pattern at the lower surface thereof.

Meanwhile, the picker may include: a pair of jaws which respectively presses both sides of the connection member; a fourth cylinder which respectively controls opening and closing of the jaws; and an operating unit which moves a picker body to which the jaws are combined in a triaxial direction.

Here, the fourth cylinder may be a pneumatic cylinder or an electric cylinder.

Also, the jaw may be bent in an L-letter form in correspondence to the form of the pocket tool.

Also, the height of the connection member may be longer than a horizontal length or a vertical length of a surface on the substrate to which the connection member is ultrasonic welded.

Here, the height of the connection member may be 0.5 mm through 20 mm.

Also, the connection member or the substrate may be formed of Cu or a composite material containing 50% or more of Cu.

According to another aspect of the present invention, there is provided a power module package for power converting apparatus to which the substrate where the connection members are ultrasonic welded by using the ultrasonic welding described above is applied.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
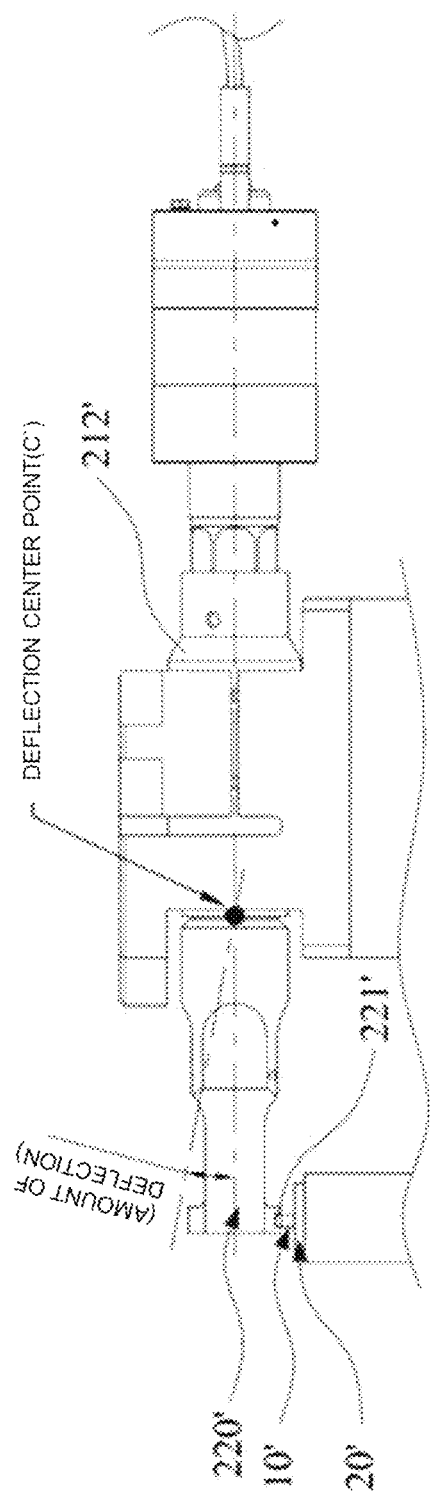
FIG. 1 illustrates ultrasonic welding according to a prior art.

Hereinafter, embodiments of the present invention will be described in more detail with reference to the accompanying drawings.

An ultrasonic welding system according to an embodiment of the present invention includes a waffle pack 110 on which connection members 10 to be ultrasonic welded onto a substrate 20 are arranged in a specific form, a centering aligning unit 120 which aligns and centers the connection members 10 transferred from the waffle pack 110, an ultrasonic welding part 130 which fixes the substrate 20 and ultrasonic welds the connection members 10 aligned by the centering aligning unit 120 onto the substrate 20, and a picker 140 which separately picks the connection members 10 from the waffle pack 110 to be transferred to the centering aligning unit 120 and re-picks the aligned connection members 10 from the centering aligning unit 120 to be transferred to ultrasonic welding positions on the substrate 20 fixed to the ultrasonic welding part 130, wherein the connection members 10 are aligned on a right position on the substrate 20 and are stood straight.

Hereinafter, the ultrasonic welding system as above will be described in more detail with reference to FIGS. 2 through 20.

Figure 2:
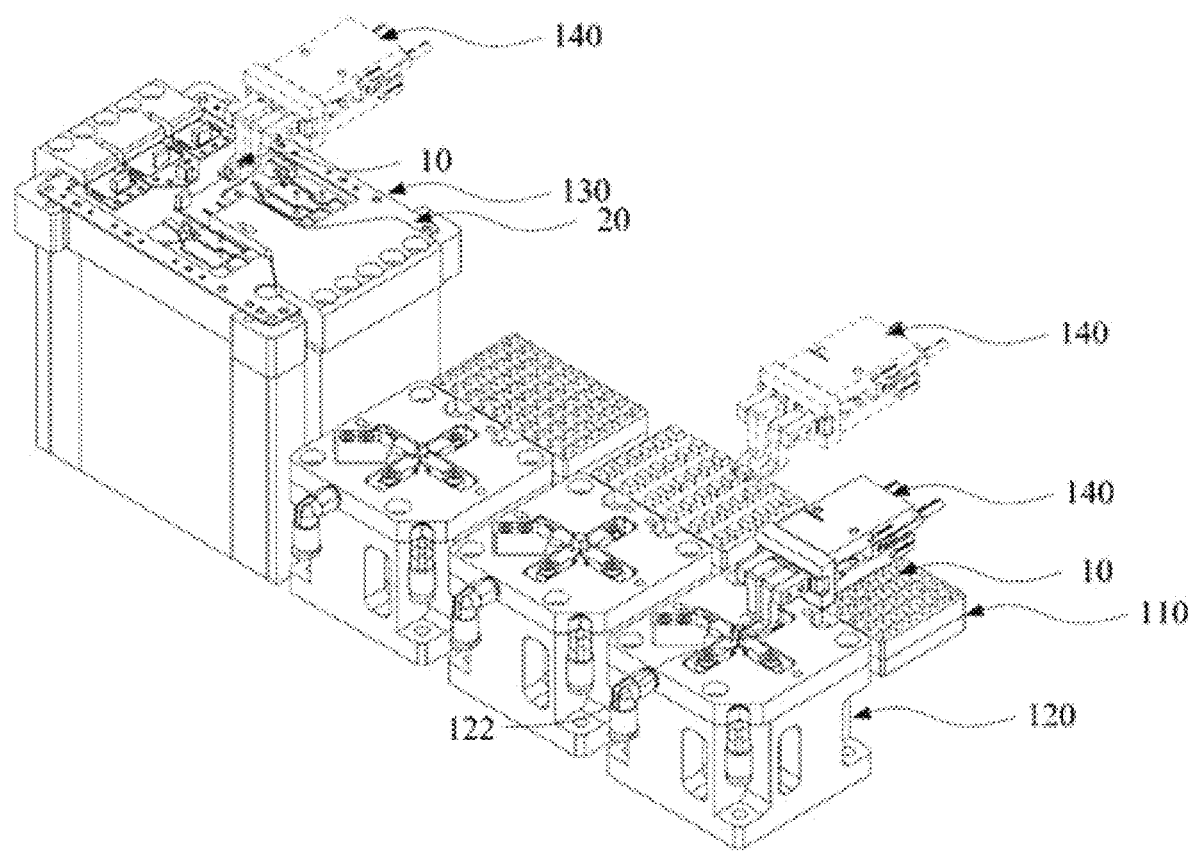
FIG. 2 illustrates an ultrasonic welding system according to an embodiment of the present invention.
Figure 3:
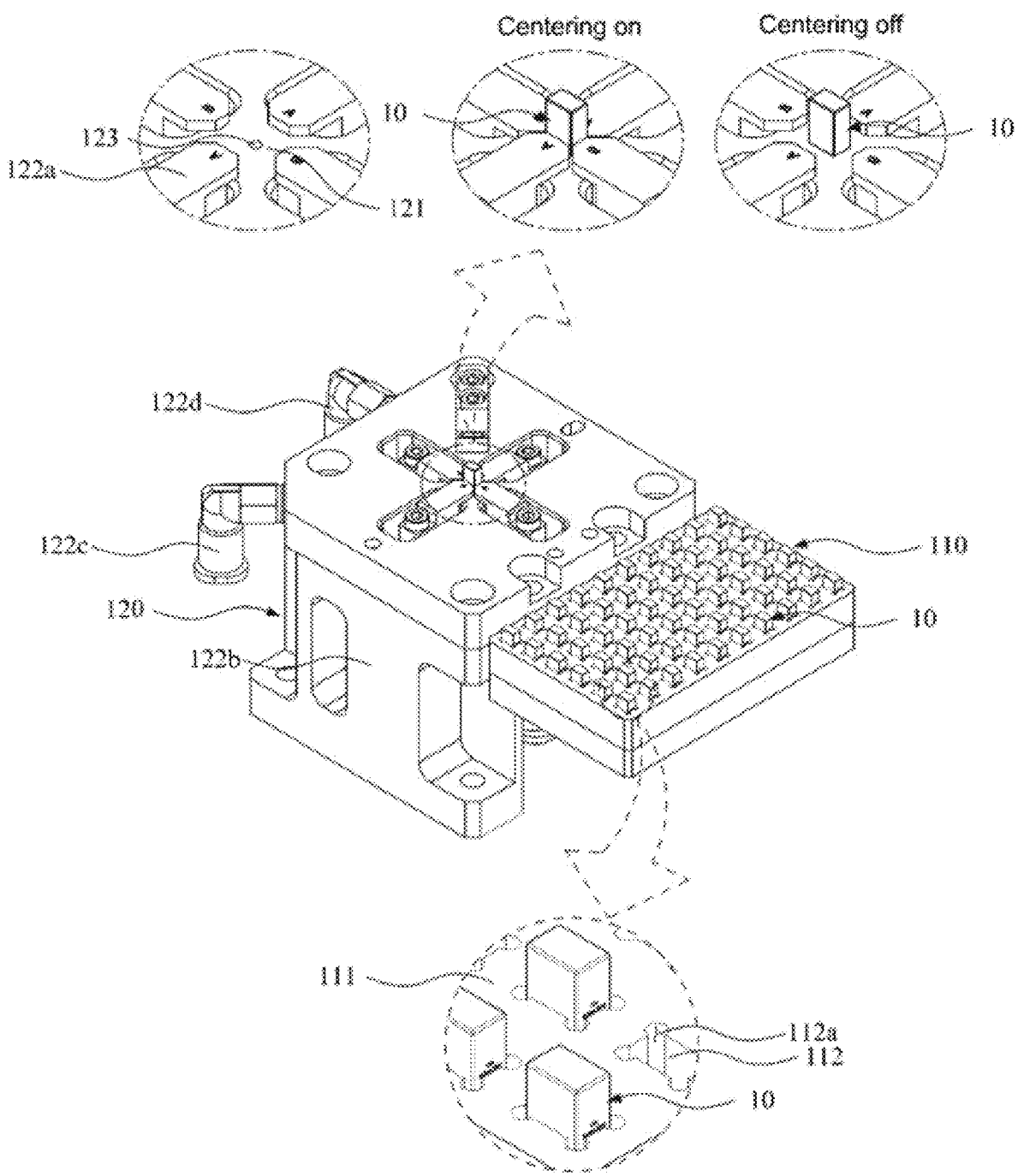
FIG. 3 separately illustrates a waffle pack and a centering aligning unit in the ultrasonic welding system of FIG. 2.
Figure 4:
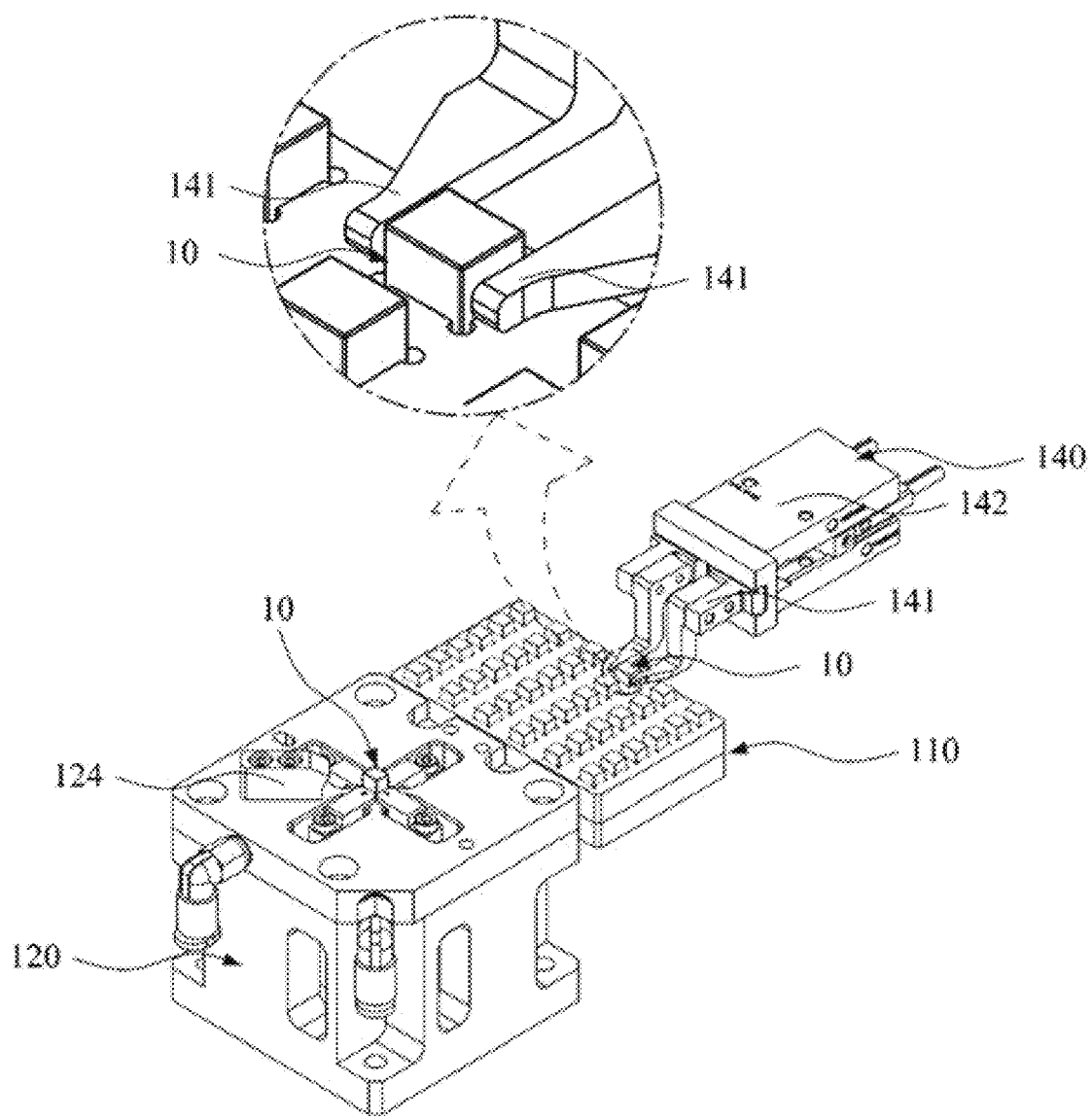
FIGS. 4 and 5 respectively illustrate a transferring operation performed by a picker in FIG. 3.

First, referring to FIGS. 2 through 4, the waffle pack 110 includes the connection members (slugs) 10 to be ultrasonic welded onto the substrate 20 arranged thereon in a specific form, wherein the connection members 10 are picked in order by the picker 140 and are transferred to the centering aligning unit 120 disposed at the front end of the waffle pack 110.

For example, as illustrated in FIGS. 3 and 4, the connection member 10 placed and loaded in a pocket 112 hollowed and formed on the upper part of a waffle pack block 111 may be picked by the picker 140 and transferred to a centering zone 121 of the centering aligning unit 120. Here, spare spaces 112a may exist at four inner corners of the pocket 112. Accordingly, when the connection members 10 are inserted into and removed from the pocket 112, the edges of the connection members 10 may not be damaged and may be easily inserted and removed.

Here, the pockets 112 may be formed to have a fixed depth corresponding to the form of the connection members 10 and may be arranged in a matrix form.

Here, the connection members 10 may be formed of Cu or a composite material containing 50% or more of Cu.

Also, the total height H (referring to FIG. 14) of the connection member 10 may be longer than a horizontal length and/or a vertical length based on a surface on the substrate 20 to which the connection member 10 is ultrasonic welded and may be preferably 0.5 mm through 20 mm.

Next, the centering aligning unit 120 is formed at the front end of the waffle pack 110 and aligns the connection members 10 transferred from the waffle pack 110 at the center of the centering zone 121. Then, the connection members 10, which are aligned at the center, are transferred and aligned on right ultrasonic welding positions of the ultrasonic welding part 130 without tolerance by the picker 140 and may be stood straight without being inclined or unbalanced.

More specifically, referring to FIG. 3, the centering aligning unit 120 may include the centering zone 121 on which the connection member 10 transferred by the picker 140 is placed and fixed, a centering unit 122 which aligns and centers the connection member 10 on the centering zone 121, and a vacuum-formed hole 123 which is formed at the middle of the centering zone 121 to provide a negative pressure and to fix the connection member 10.

Here, the vacuum-formed hole 123 may provide a negative pressure to a lower surface of the connection member 10 placed on the centering zone 121 by the picker 140 so as to form vacuum and prevent the connection members 10 from being separated or fell down. Also, after aligning at the center, the vacuum-formed hole 123 may release vacuum when the connection members 10 are re-picked to the ultrasonic welding part 130.

Figure 6:
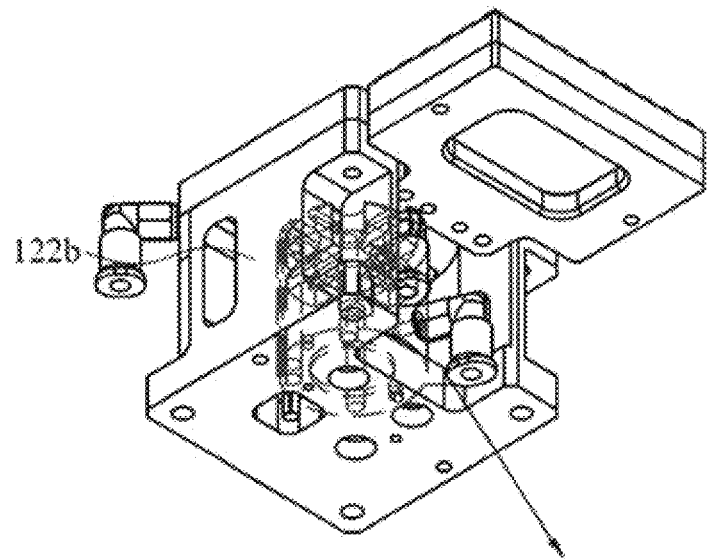
FIG. 6 illustrates an operation of a centering aligning unit in the ultrasonic welding system of FIG. 2.
Figure 6:
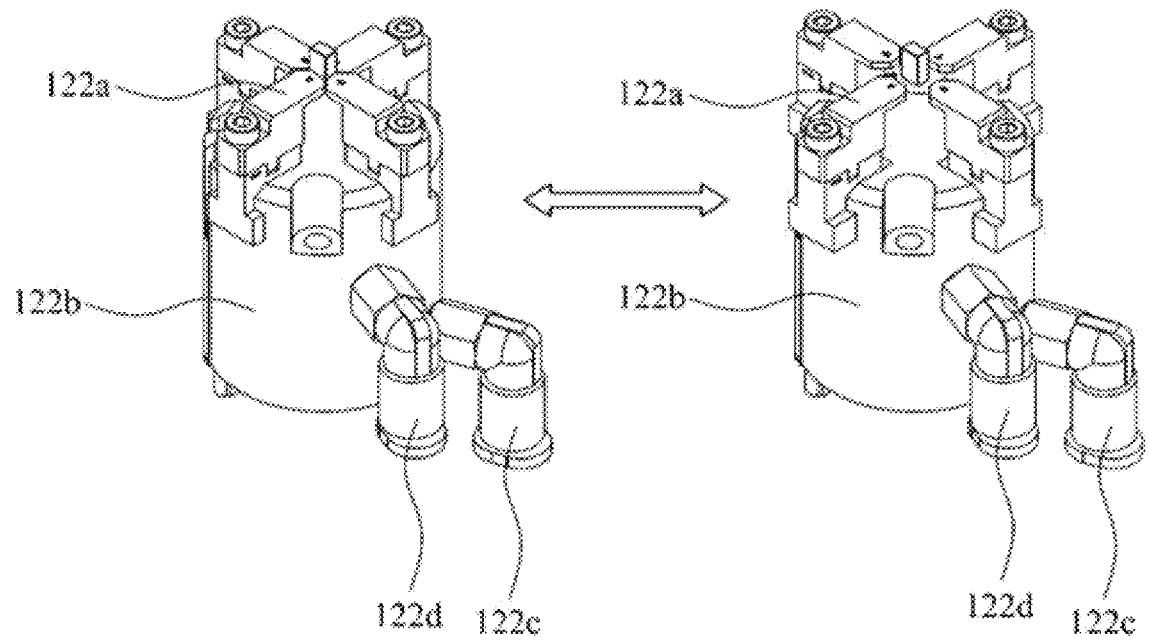

In addition, as illustrated in FIGS. 3 and 6, the centering unit 122 may include 2 to 5 centering jaws 122a, a centering block 122b, a first pneumatic cylinder 122c, and a second pneumatic cylinder 122d, wherein the centering jaws 122a are spaced apart from each other by the same interval on a concentric circle so as to stroke back and forth toward the center of the centering zone 121, the centering block 122b includes the centering zone 121 in the middle at the upper part thereof and guides the stroke of the centering jaws 122a back and forth, the first pneumatic cylinder 122c is combined to one side of the centering block 122b to interlock each centering jaw 122a by a pneumatic pressure and to stroke each centering jaw forward and pressurizes each side of the connection members 10 at the same time, and the second pneumatic cylinder 122d is combined to the other side of the centering block 122b to interlock each centering jaw 122a by a pneumatic pressure and to stroke each centering jaw 122a backwards and opens the centering zone 121.

Moreover, as mentioned above, two facing centering jaws 122a may be formed based on the centering zone 121 so as to perform centering alignment with respect to any one of X-axis and Y-axis, four facing centering jaws 122a may be formed based on the centering zone 121 so as to simultaneously perform centering alignment with respect X-axis and Y-axis, or three or five facing centering jaws 122a may be formed based on the centering zone 121 so as to perform centering alignment with respect to the connection members 10.

Furthermore, referring to FIG. 4, the centering aligning unit 120 further includes a blower 124 which sprays compressed air to the connection member 10 fixed to the centering zone 121. Here, a spray hole (not illustrated) is formed toward the centering zone 121 at the front end of the blower 124 so that air may be sent in an instant through the spray hole before re-picking by the picker 140 so as to remove foreign substances attached on the surface of the connection member 10 and thereby, quality of ultrasonic welding may be increased.

Next, the ultrasonic welding part 130 fixes the substrate 20 and ultrasonic welds and bonds the connection members 10 aligned and transferred by the centering aligning unit 120 onto the substrate 20.

The substrate 20 may include a lead frame and may be formed of Cu or a composite material containing 50% or more of Cu.

Figure 7:
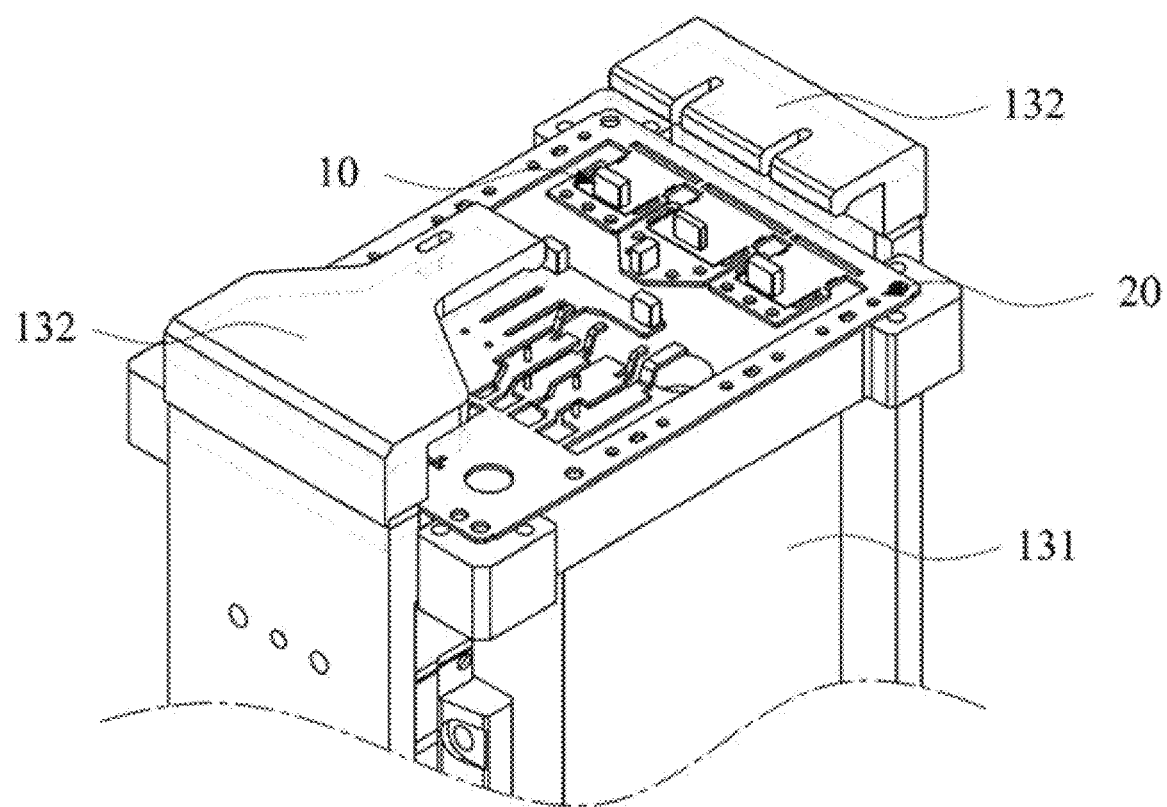
FIG. 7 separately illustrates an ultrasonic welding part in the ultrasonic welding system of FIG. 2.
Figure 10:
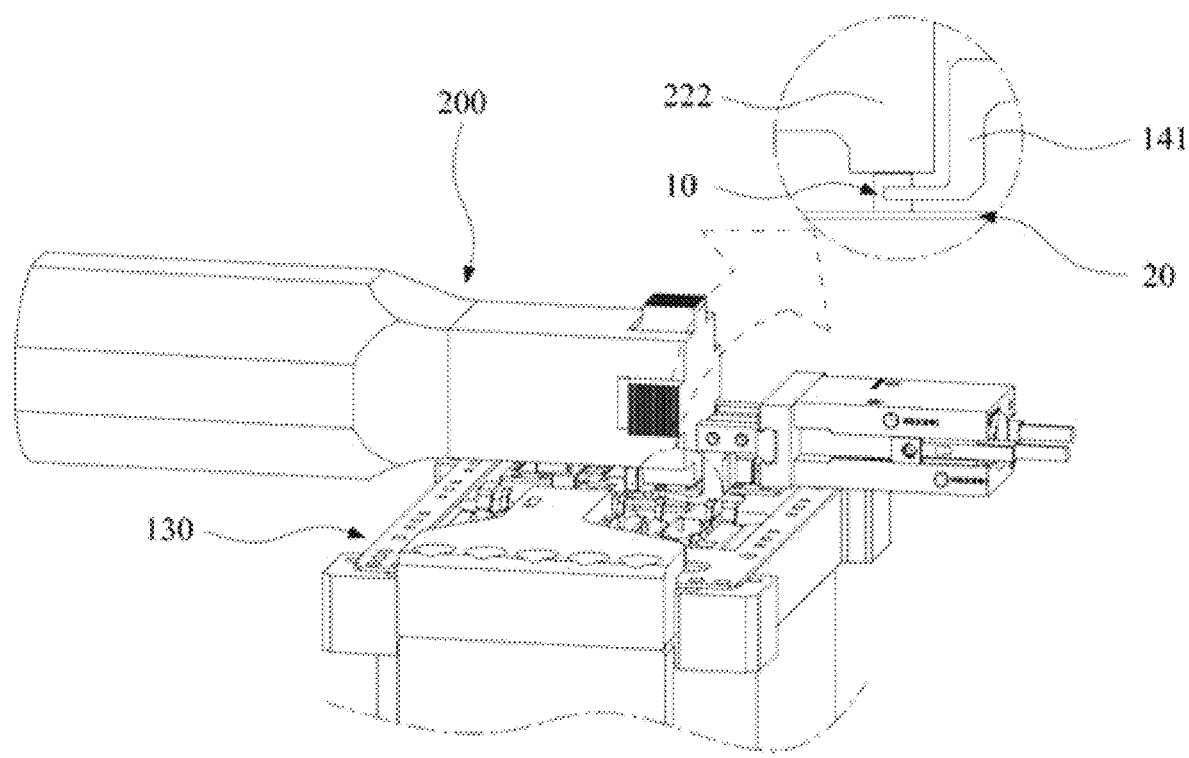
FIGS. 10 through 12 respectively illustrate an ultrasonic welding unit according to an embodiment of the present invention.

For example, referring to FIGS. 7 and 10, the ultrasonic welding part 130 may include a bonding block 131 on which the substrate 20 or a lead frame is placed on the upper part thereof, a clamp unit 132 which senses the placement of the substrate 20 and fixes the substrate 20 to the upper part of the bonding block 131, and an ultrasonic welding unit 200 which ultrasonic welds the connection members 10 placed on the substrate 20 fixed by the clamp unit 132.

Figure 8A:
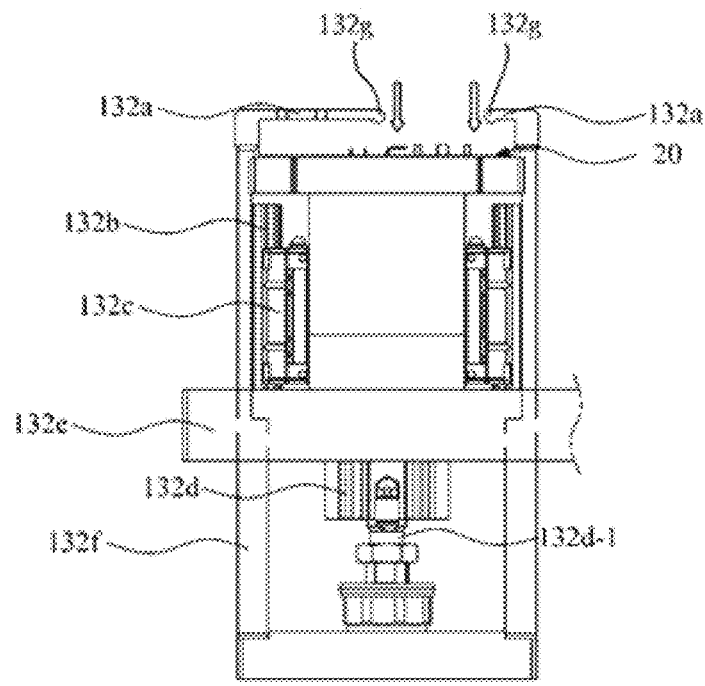
FIGS. 8A and 8B illustrate an operation of a clamp in the ultrasonic welding part of FIG. 7.
Figure 8B:
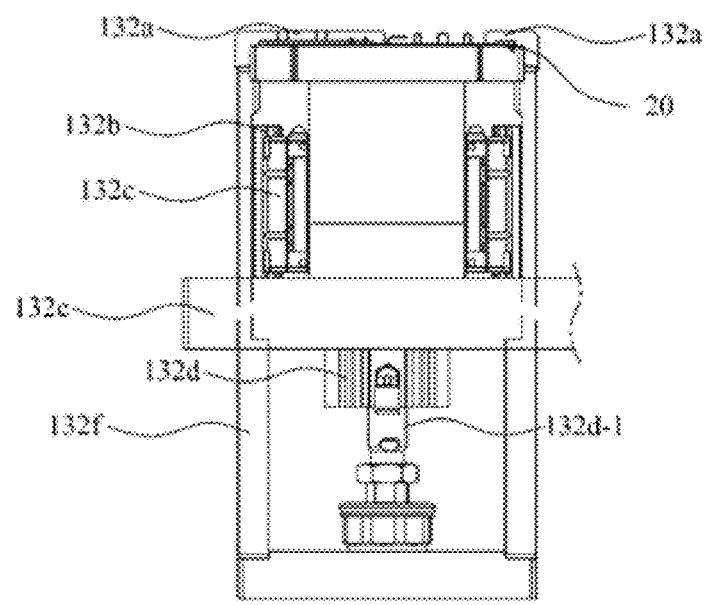

Here, more specifically, the clamp unit 132 may include a pair of clamps 132a, LM guide rails 132b, LM guides 132c, third pneumatic cylinders 132d, a supporting frame 132e, and lift plates 132f as illustrated in FIGS. 8A and 8B, wherein the pair of clamps 132a is formed to face each other at the upper part of the bonding block 131 and to be lifted and stably fixes the substrate 20 as the substrate 20 is placed, the LM guide rails 132b are extended in a vertical direction at the lower part of each clamp 132a and are each combined to the clamps 132a, the LM guides 132c guide the LM guide rails 132b to be lifted, the third pneumatic cylinders 132d lift the LM guides 132c, the supporting frame 132e includes the LM guides 132c fixed at the upper part thereof and the third pneumatic cylinders 132d fixed at the lower part thereof, and lift plates 132f to which the LM guide rails 132b are each combined are extended toward the lower end.

In this regard, a rod 132d-1 of the third pneumatic cylinders 132d is combined to the lift plates 132f and lifts the clamps 132a combined to the lift plates 132f according to back-and-forth stroke of the rod 132d-1 so that the substrate 20 may be pressurized and fixed or released.

Meanwhile, pressure holes 132g which pressurize the upper surface of the substrate 20 are protruded and formed at the lower front end of the clamp 132a so as to minimize contact with the substrate 20 and stably fix the substrate 20.

Also, referring to FIGS. 10 through 13, the ultrasonic welding unit 200 includes a housing 210 and a horn 220, wherein the housing 210 covers a booster 212 to which ultrasonic vibration of 10 Khz through 50 Khz transmitted from a converter 211 is applied and the horn 220 includes a pocket tool 222. Here, one side of the pocket tool 222 is combined to the front end of the booster 212 and the other side of the pocket tool includes a knurling pattern 224 adhered to the upper surface of the connection member 10. In this regard, ultrasonic waves may be transmitted to the connection members 10 to be bonded.

Figure 11:
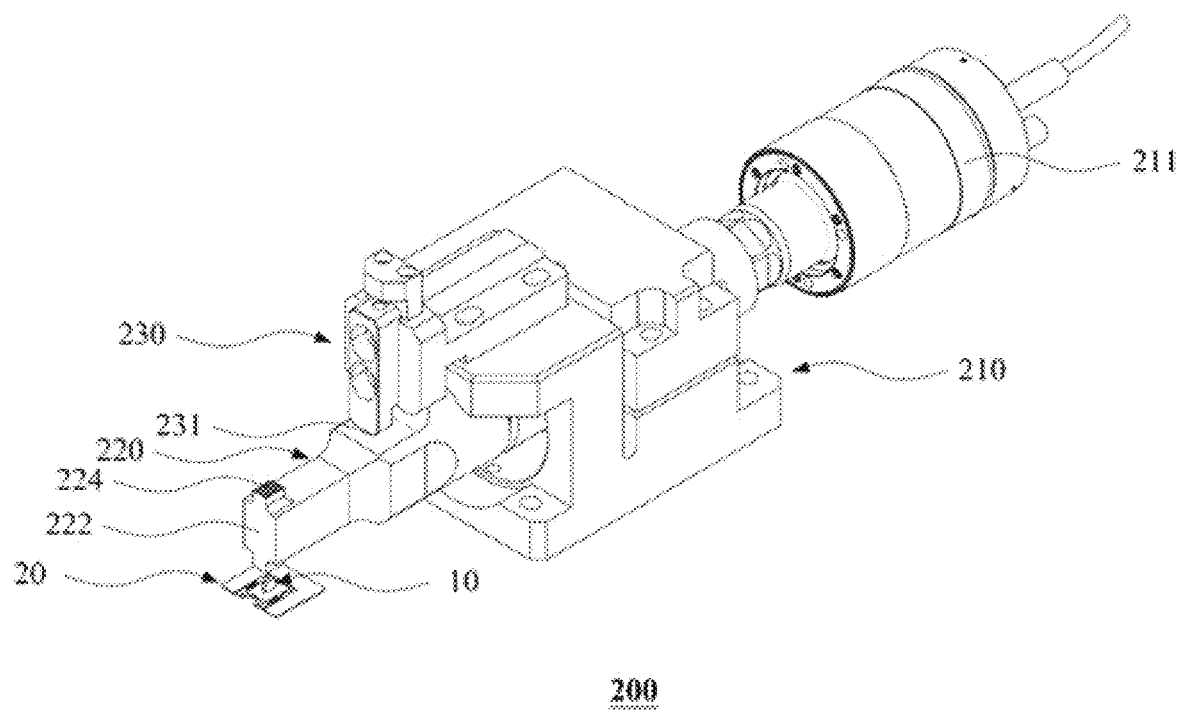
Figure 12:
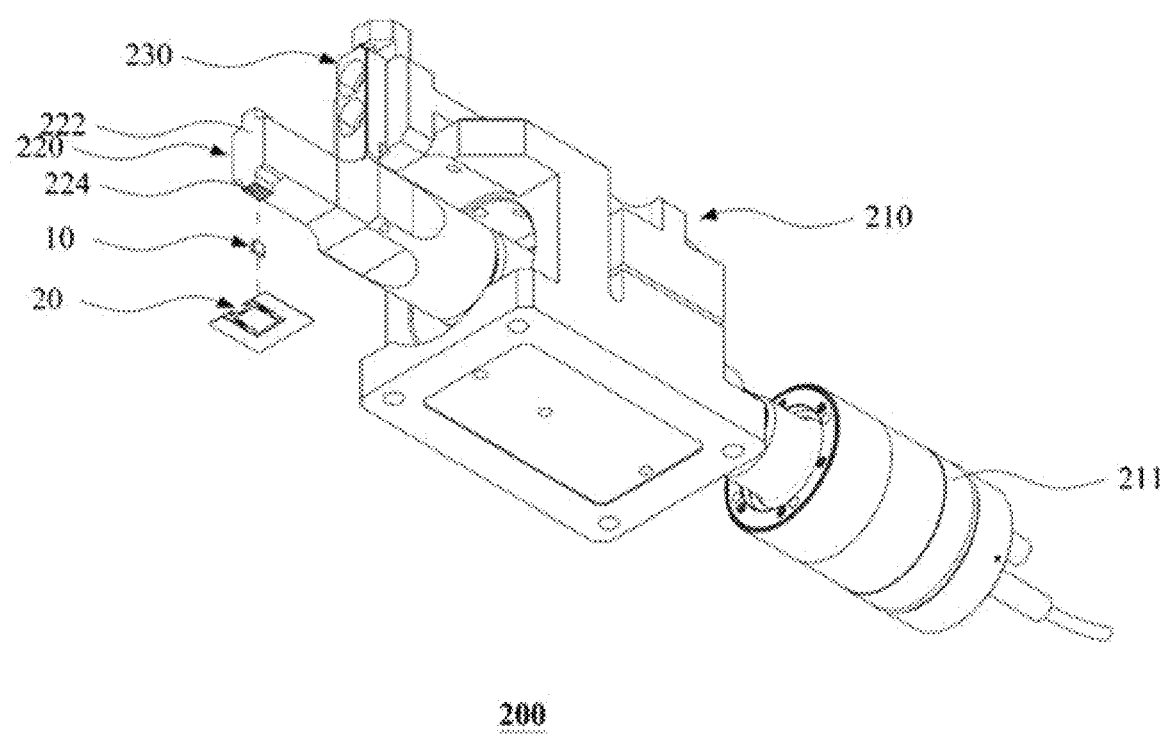
Figure 13:
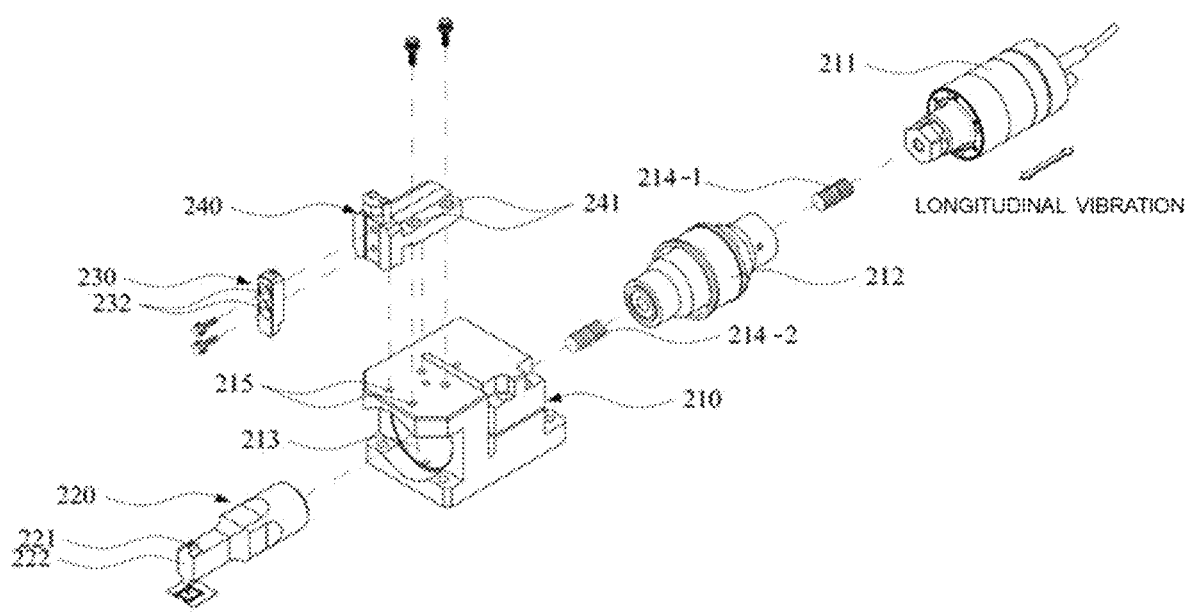
FIG. 13 is an exploded view of the ultrasonic welding unit of FIG. 11.

More specifically, referring to FIGS. 11 through 13, the housing 210 covers the booster 212 and more particularly, the booster 212 to which ultrasonic waves is applied from the converter 211 that generates longitudinal waves of 20 Khz through 35 Khz so that the booster 212 may be combined and fixed to a hollow 213.

Meanwhile, a pneumatic cylinder (not illustrated) is combined to the lower surface of the housing 210 so as to be lifted and descended. The converter 211 converts an electrical signal having high frequency into mechanical longitudinal vibration and may be bolt joined to the booster 212 by using a booster bolt 214-1 interposed therebetween. The booster 212 may output an amplitude of ultrasonic vibration which passes between the converter 211 and the horn 220 by 1:1 to the horn 220, increase an amplitude, or lower an amplitude.

Next, the horn 220 is combined to the booster 212 and transmits ultrasonic vibration having frequency of 10 Khz through 50 Khz to the connection members 10. More specifically, one side of the horn 220 is bolt joined to the front end of the booster 212 by using a horn bolt 214-2 and the pocket tool 222 which pressurizes the upper surface of the connection member 10 bonded to the upper surface of the substrate 20 such as a lead frame is included on the other side of the horn 220.

That is, the horn 220 may pressurize the connection member 10 by using the pocket tool 222, transmit ultrasonic waves to the connection member 10, and ultrasonic bond the connection member 10 onto the substrate 20.

Figure 14:
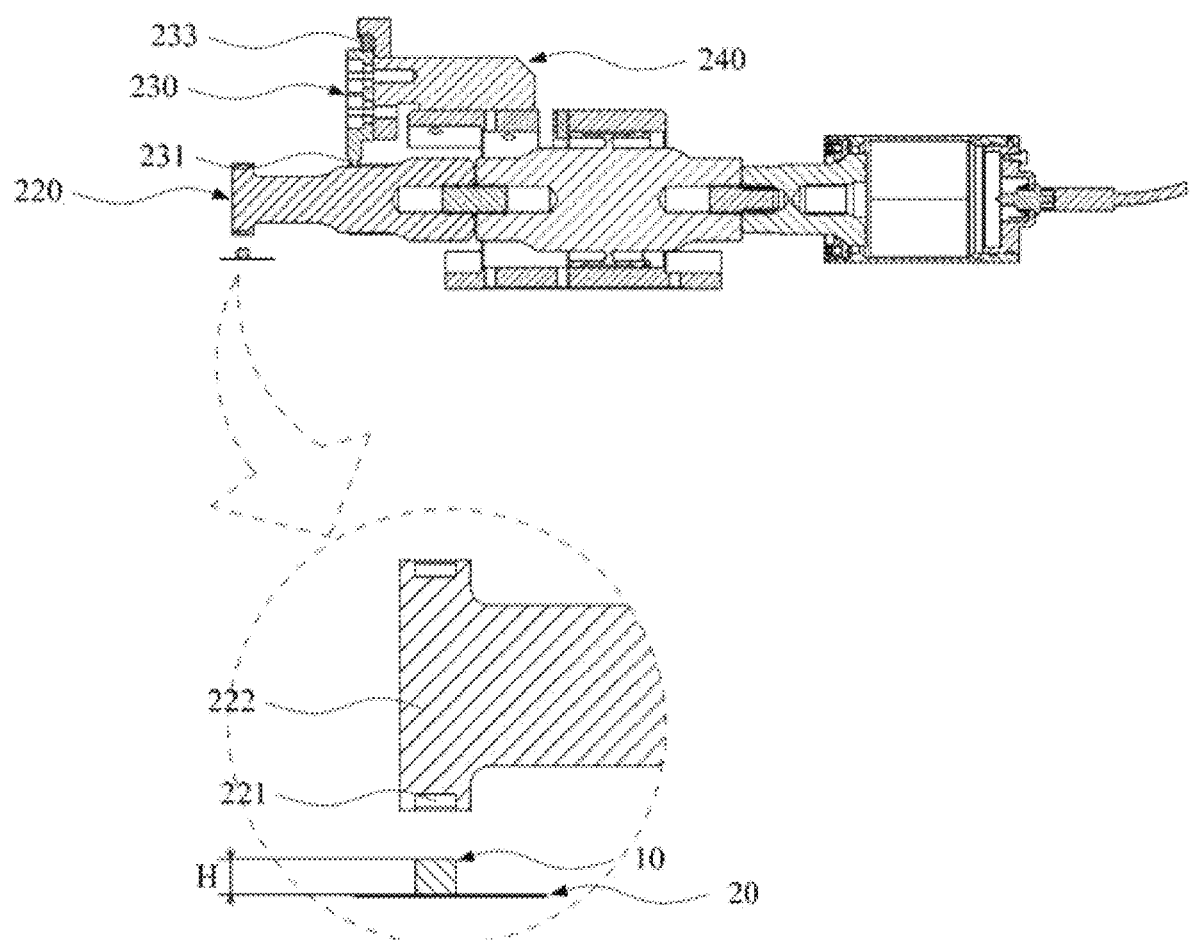
FIG. 14 is a cross-sectional view of the ultrasonic welding unit of FIG. 11.

Meanwhile, as illustrated in FIGS. 13 and 14, an engraved hole 221 is formed and hollowed in the pocket tool 222 and thereby, the upper part of the connection member 10 may be partially inserted thereinto. Also, when the connection member 10 is ultrasonic bonded to the substrate 20, ultrasonic waves is transmitted to the connection member 10 and the connection member 10 may be bonded onto the substrate 20 while more than 10% of the total height H of the connection member 10 is inserted into the engraved hole 221.

Also, referring to FIGS. 17A, 17B, 17C, 17D, 17E and 17F, the engraved hole 221 may be formed and hollowed in the pocket tool 222 in a hexahedral form as illustrated in (A) or in a cylindrical form as illustrated in (B) in correspondence to the form of the connection member 10. In this regard, the engraved hole 221 may have various forms according to adsorption capacity required to the connection member 10 and the form of the connection member 10.

Figure 18A:
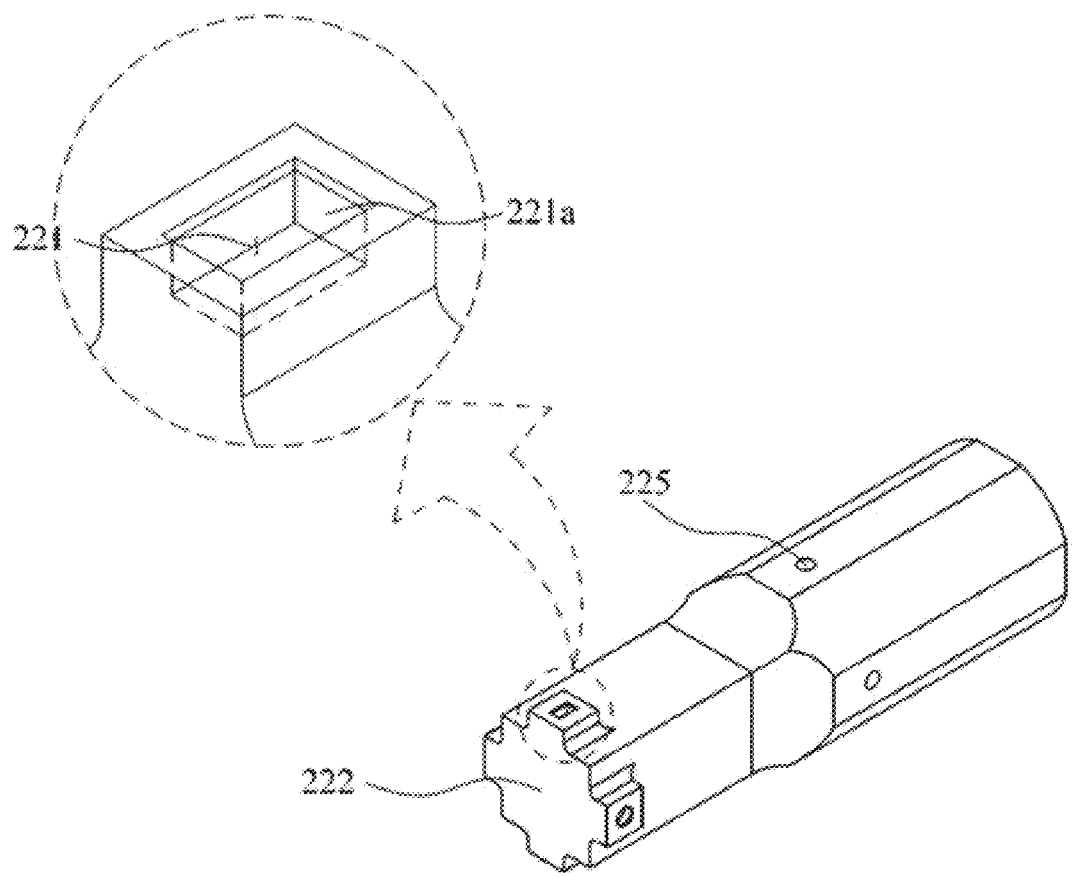
FIGS. 18A and 18B illustrate a vacuum hole of the ultrasonic welding unit of FIG. 11.
Figure 18B:
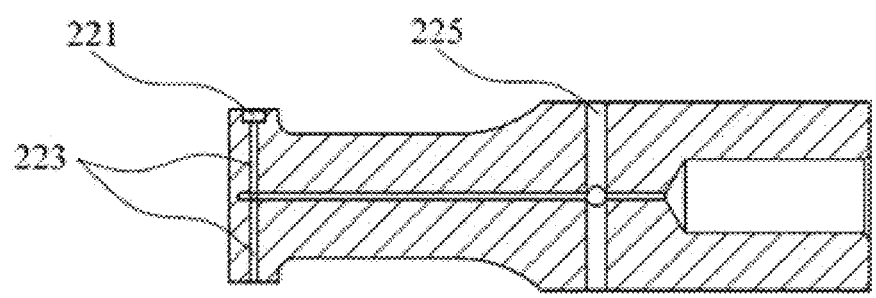

In addition, referring to FIGS. 18A and 18B, a vacuum hole 223 may be further included in the engraved hole 221, wherein the vacuum hole 223 is penetrated into the engraved hole 221 and vacuum adsorbs one surface of the connection member 10 by using a negative pressure. Here, the vacuum hole 223 communicated with a vacuum port 225 which forms vacuum may be used to adsorb the connection member 10 and may fix the connection member 10 to the substrate 20 before the connection member 10 is ultrasonic bonded to the substrate 20.

Here, the vacuum hole 223 provides antioxidant gas during ultrasonic bonding and thereby, may prevent the connection members 10 from being oxidized.

Here, the antioxidant gas may be $N_2$ or mixed gas including $N_2$. However, the present invention is not limited thereto and the antioxidant gas may be various gas used for the purpose of antioxidant. Also, means for providing the antioxidant gas may be separately included and more preferably, may be the vacuum hole 223 (refer to FIG. 18B).

Figure 17A:
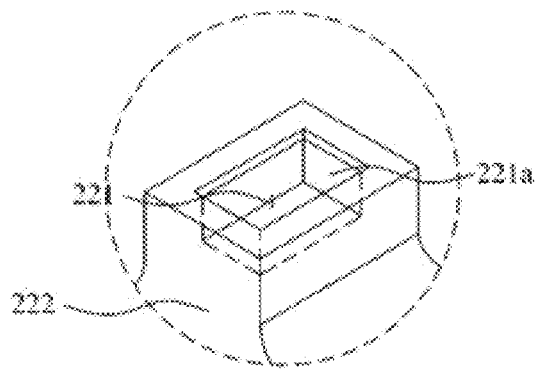
FIGS. 17A, 17B, 17C, 17D, 17E and 17F respectively illustrate a structure of an engraved hole and knurling pattern in the ultrasonic welding unit of FIG. 11.
Figure 17B:
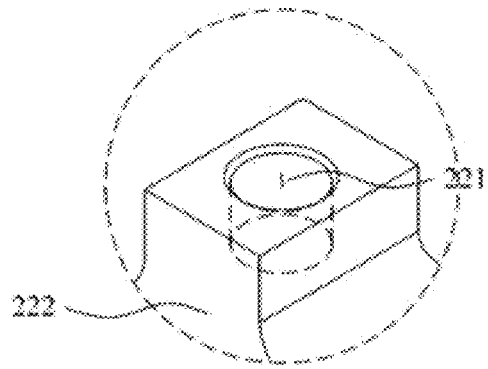
Figure 17C:
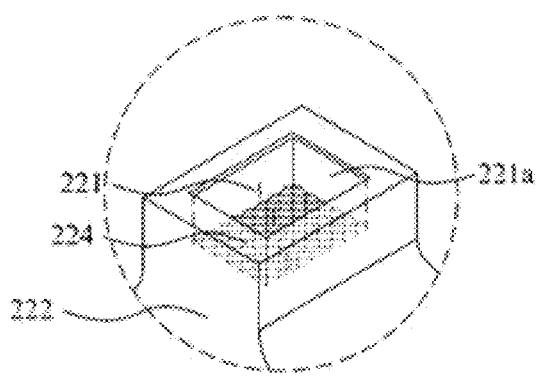
Figure 17D:
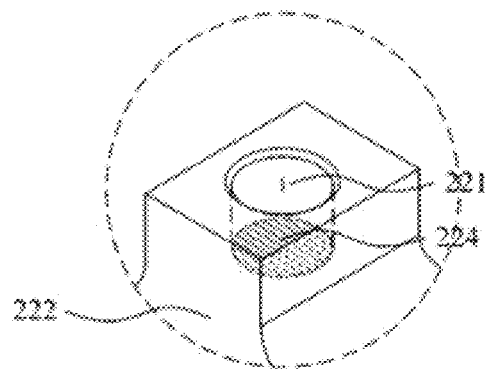

Also, referring to FIGS. 17C and 17D, the knurling pattern 224 is formed on the lower surface of the engraved hole 221 so that the knurling pattern 224 may be pressurized on the upper surface of the connection member 10, ultrasonic waves may be transmitted to the connection member 10 with the minimum loss, and slip between the connection member 10 and the horn 220 may be prevented. Also, as illustrated in FIG. 17C, the knurling pattern 224 may be an X-form knurling pattern which is formed in various ways within a pitch range of 0.3 mm through 1.0 mm or as illustrated in FIG. 17D, the knurling pattern 224 may be a straight-lined knurling pattern which is formed in various ways within a pitch range of 0.3 mm through 1.0 mm.

As described above, the knurling pattern formed by being pressurized on the upper surface of the connection members 10 may then expand a surface area when an adhesive is coated, and thereby, increase adhesive strength.

That is, the connection member 10 is fixed onto the substrate 20 by the engraved hole 221 and is vibrated, the lower surface of the connection member 10 is ultrasonic bonded to the substrate 20. Also, the knurling pattern is formed on the upper surface of the connection member 10 in correspondence to the knurling pattern 224 of the engraved hole 221. Here, when other member is bonded to the upper surface of the connection member 10 ultrasonic bonded to the substrate 20 by coating an adhesive, a coated area may be formed to be wide by the knurling pattern.

Figure 20:
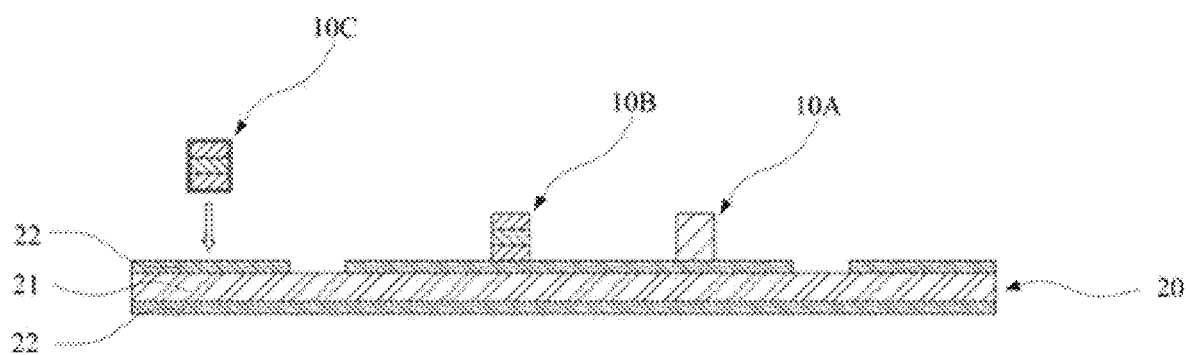
FIG. 20 illustrates a structure of a substrate to which the ultrasonic welding unit of FIG. 11 is applied.

Meanwhile, referring to FIG. 20, the substrate 20 may include at least one insulating layer 21, wherein the insulating layer 21 may be formed of $Al_2O_3$, AlN and/or $Si_3N_4$ and the substrate 20 may be formed of a metal material 22.

Also, the connection member 10A may be a block formed of a metal material, for example, copper, and the connection members 10B and 10C may be formed of at least two metal materials having each different thermal expansion coefficient structurally bonded to each other. That is, the connection member 10 may include a single metal material (10A), metal layers having each different thermal expansion coefficient (10B), or a plating layer formed on the outside thereof (10C).

Figure 17E:
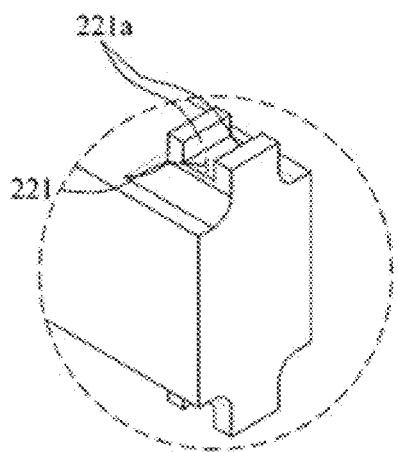
Figure 17F:
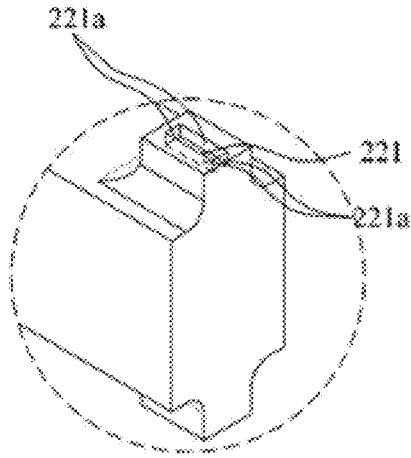

In addition, the engraved hole 221 is may be formed and hollowed in a hexahedral form. Here, as illustrated in FIG. 17E, the engraved hole 221 includes two facing pocket walls 221a so as to fix and hold the connection member 10 without separation while in ultrasonic vibration in a longitudinal direction. Also, as illustrated in FIG. 17F, the engraved hole 221 includes four pocket walls 221a which face each other so as to stably vacuum adsorb and fix the connection member 10.

Moreover, the pocket tool 222 may contain 50% or more of Fe from among the total forming material.

Also, the pocket tool 222 may be formed of alloy steel containing 2% through 10% of Cr, W, and/or Mo.

Furthermore, referring to FIGS. 16A, 16B, 16C and 16D, end portions in the pocket tool 222 which pressurize the connection member 10 are designed to have 2 directions or 4 directions in consideration of the life of the horn 220 so that the number of welding areas is increased. Accordingly, when the engraved hole 221 is damaged or when the knurling pattern 224 is worn away, the engraved hole 221 or the knurling pattern 224 in other direction may be used.

Next, the deflection prevention block 230 prevents the horn 220 from being deflected due to ultrasonic vibration. More specifically, referring to FIGS. 11 and 13, the deflection prevention block 230 is combined to the upper front end of the housing 210 and presses and supports a specific part at the upper part of the horn 220, that is, a nodal point, so that the deflection prevention block 230 prevents the horn 220 from being bent in an upper direction.

Figure 15:
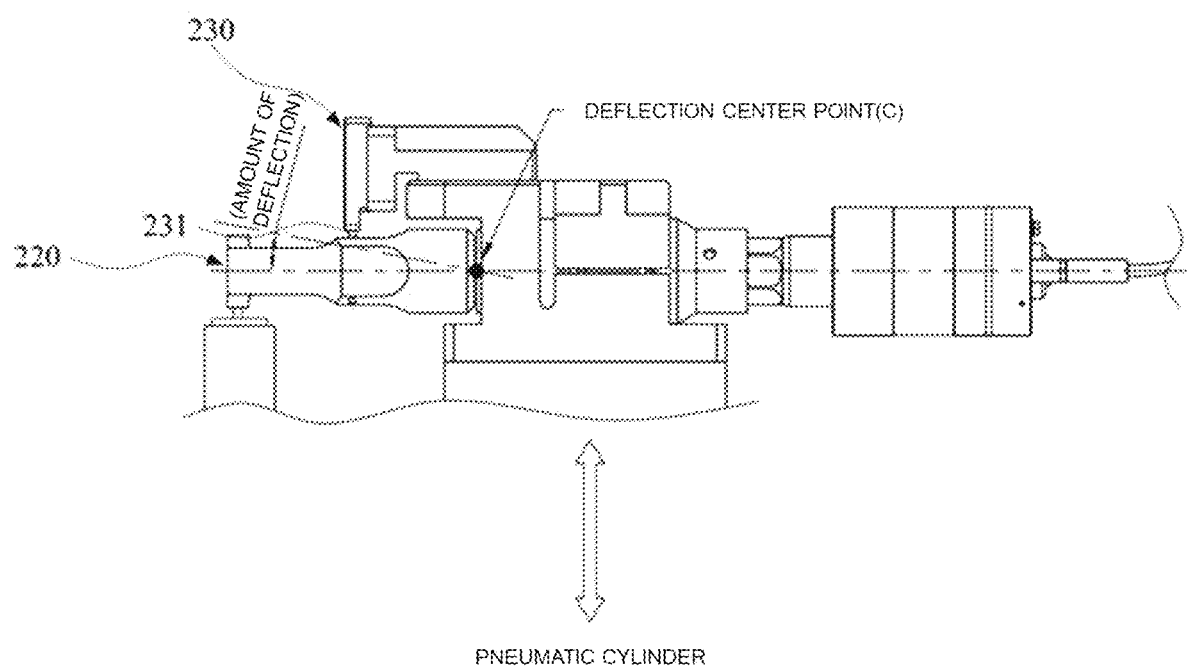
FIG. 15 illustrates a function of a deflection prevention block in the ultrasonic welding unit of FIG. 11.
Figure 16A:
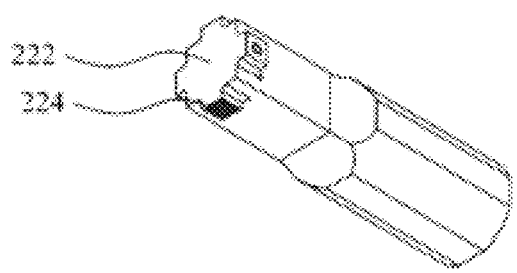
FIGS. 16A, 16B, 16C and 16D illustrate various examples of a horn in the ultrasonic welding unit of FIG. 11.
Figure 16B:
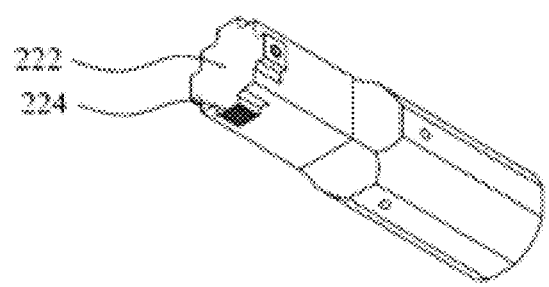
Figure 16C:
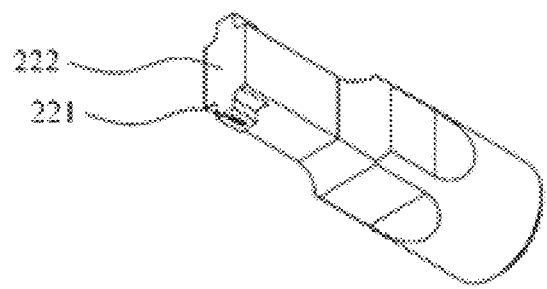
Figure 16D:
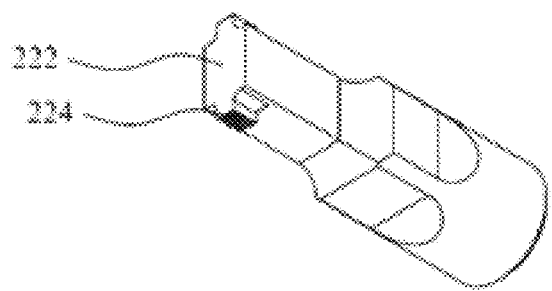
Figure 19A:
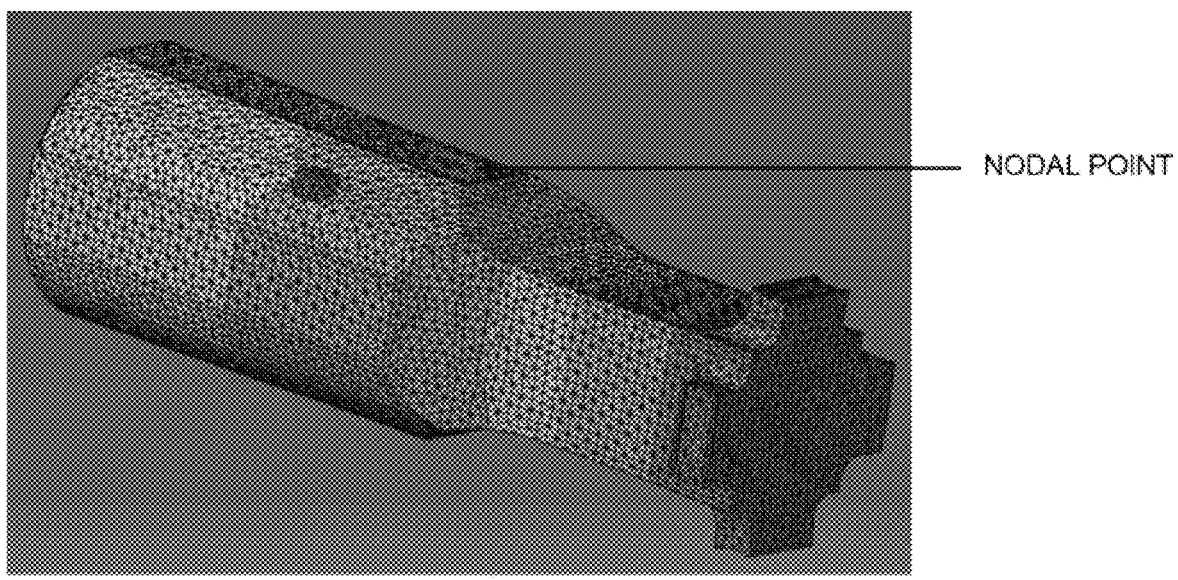
FIGS. 19A and 19B illustrate a simulation for setting a nodal point of a horn in the ultrasonic welding unit of FIG. 11.
Figure 19B:
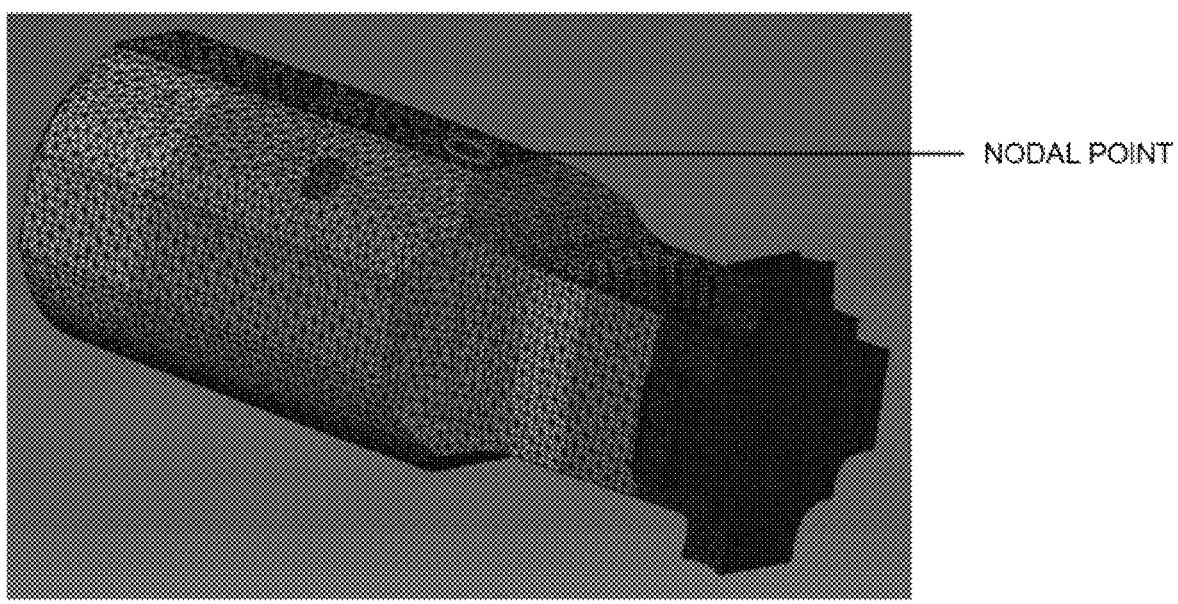

For example, referring to FIGS. 15 and 19B, while in ultrasonic bonding, the horn 220 is pressurized in a downward direction and a constant pressure is applied to the connection member 10. Here, the front end of the horn 220 is deformed in an upward direction by a fixed amount of deflection based on a deflection center point C formed at an area where the booster 212 and the horn 220 are joined. Accordingly, flatness of the connection member 10 is inclined and thereby, the whole surface area of the member 10 may not be uniformly bonded so that ultrasonic welding may not be appropriately performed. In this regard, a hemisphere-formed pressure hole 231 of the deflection prevention block 230 may support the nodal point and thereby, may prevent the horn 220 from being deflected.

Here, as illustrated in FIGS. 19A and 19B, the nodal point is a resonance point and may be set to a point where ultrasonic oscillation reaches at the least through a simulation. That is, an area where a starting point of an amplitude when an amplitude from left to right is at the minimum as in 19A and a starting point of an amplitude when an amplitude from left to right is at the maximum as in 19B are overlapped may be set.

For example, the pressure hole 231 of the deflection prevention block 230 may be spaced apart from the center of the engraved hole 221 by a range of 20% through 80% of the total length of the horn 220 and may press and support the upper part of the horn 220.

Also, referring to FIG. 13, long joining holes 232 which are spaced apart from each other up and down are formed in the deflection prevention block 230 and are bolt joined to the front end of a positioning block 240 so that an up-and-down position of the deflection prevention block 230 may be adjusted and fixed.

Next, the positioning block 240 is combined to the upper part of the housing 210 and may adjust a front-and-rear position of the deflection prevention block 230.

For example, referring to FIG. 13, bolt holes 215 are penetrated and formed on the upper part of the housing 210 and long joining holes 241 are penetrated and formed on the positioning block 240 in correspondence to the bolt holes 215 so that the housing 210 and the positioning block 240 are bolt joined and combined to each other. Here, a front-and-rear joining position of the positioning block 240 may be adjusted and a position of pressurizing from the pressure hole 231 may be adjusted.

Meanwhile, the positioning block 240 is combined to the upper part of the housing 210 and then, the deflection prevention block 230 may be combined to the front end of the positioning block 240 in order.

Here, referring to FIG. 14, before the deflection prevention block 230 is combined to the positioning block 240, the deflection prevention block 230 may be pressurized at a constant pressure by using a coil spring 233 before the deflection prevention block 230 is fixed, and an alignment position may be accurately determined, while the nodal point of the horn 220 is identified with the naked eye. Then, the deflection prevention block 230 may be fixed to the positioning block 240 by using bolts.

In this regard, a power semiconductor such as IGBT, MOSFET, and/or a diode may be electrically bonded to the connection member 10 and the connection member 10 ultrasonic bonded to the substrate 20 may be used as a material for forming a semiconductor package.

Next, the picker 140 separately picks the connection member 10 from the waffle pack 110 to transfer the connection members 10 to the centering aligning unit 120 and re-picks the connection member 10 aligned by the centering aligning unit 120 to transfer the connection members 10 to an ultrasonic welding position on the substrate 20 fixed to the ultrasonic welding part 130.

Figure 5:
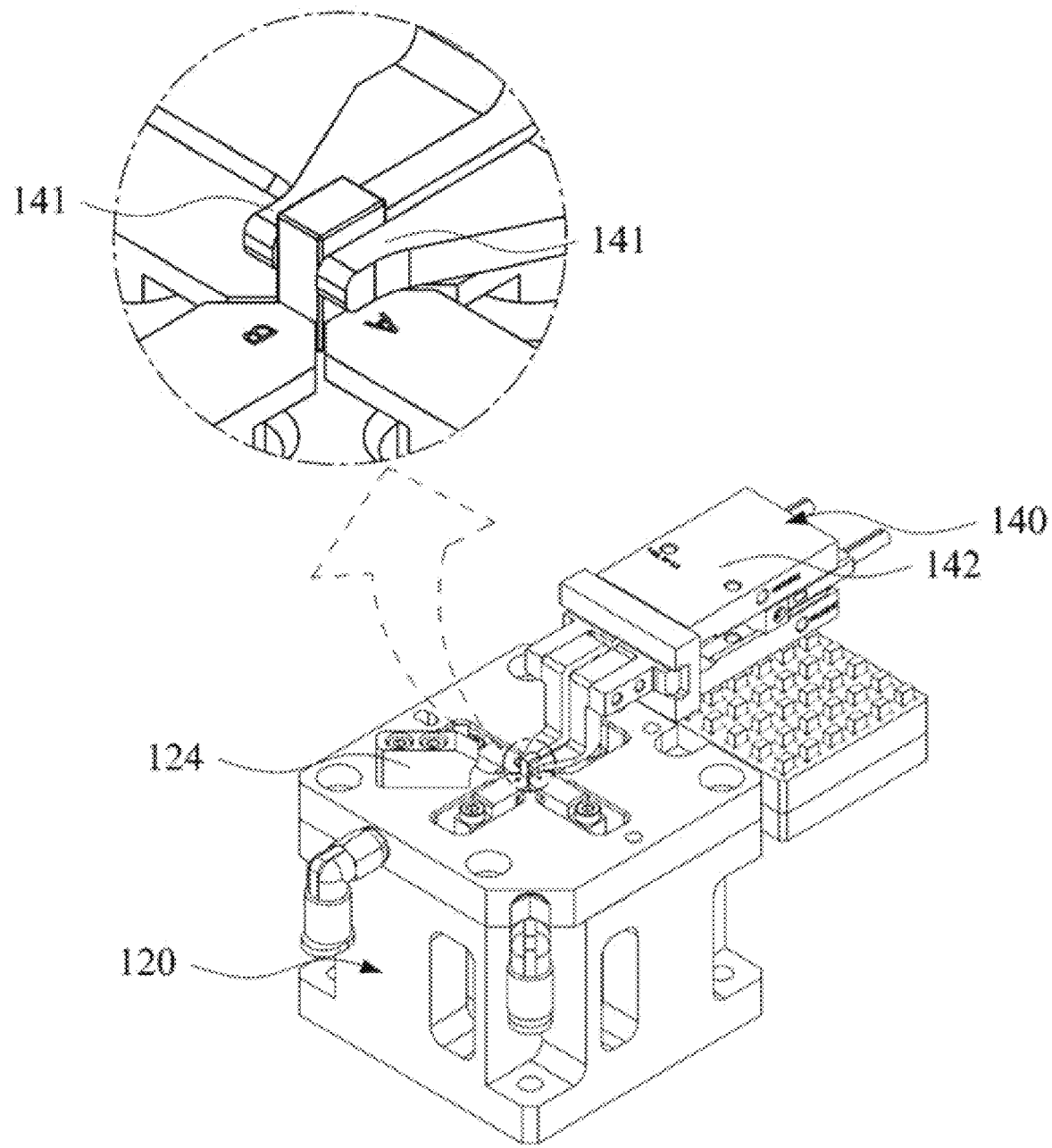

More specifically, referring to FIGS. 4 and 5, the picker 140 may include a pair of jaws 141 which respectively presses both sides of the connection member 10, a fourth pneumatic cylinder (not illustrated) which respectively controls opening and closing of the jaws 141, and an operating unit (not illustrated) such as a pneumatic cylinder and an electric cylinder which moves a picker body 142 combined for the jaws 141 to be slid left and right in a triaxial direction.

Figure 9:
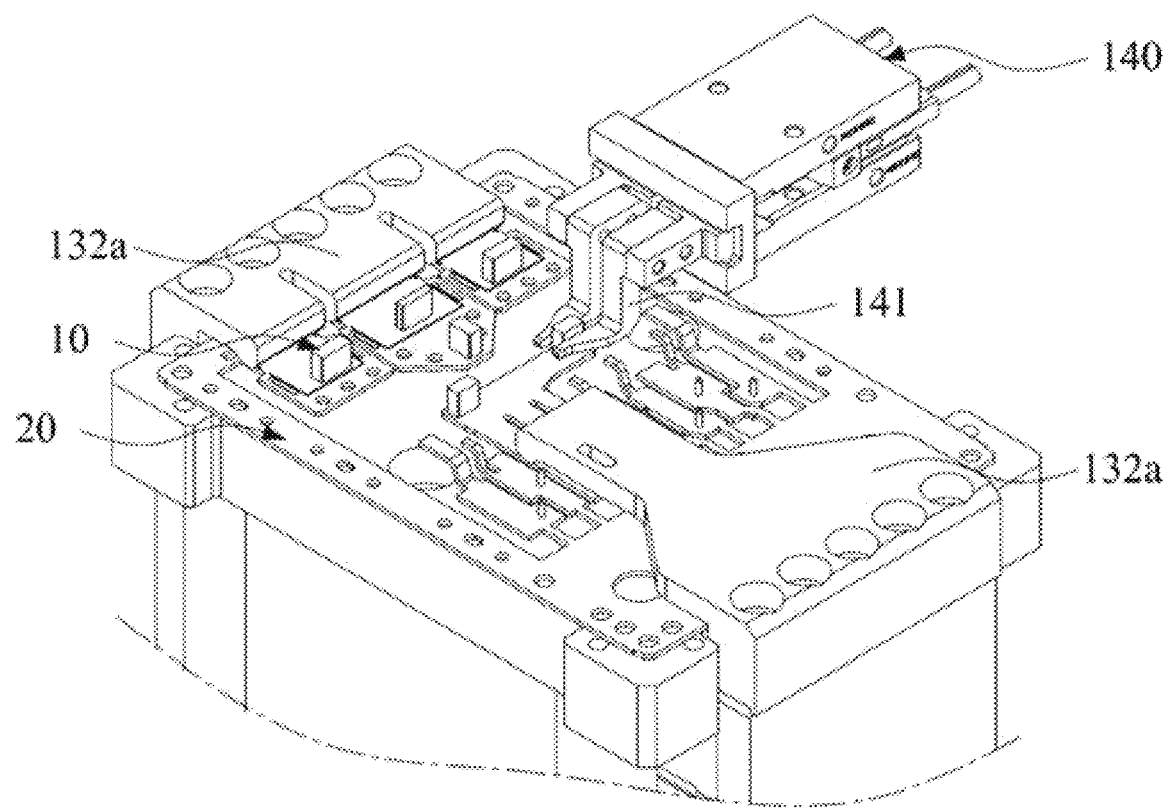
FIG. 9 illustrates an operation of a picker in the ultrasonic welding part of FIG. 7.

Meanwhile, as illustrated in FIG. 9 and an enlarged view of FIG. 10, the jaw 141 may be bent in an L-letter form in correspondence to the form of the pocket tool 222. Accordingly, when the connection member 10 transferred to the ultrasonic welding position on the substrate 20 is ultrasonic welded to the substrate 20, the jaw 141 may stably grip the connection member 10 without disturbance from the front end of the horn 220 which applies ultrasonic waves.

According to the ultrasonic welding system described above, the connection members installed on the waffle pack are picked, aligned at the center, and then re-picked so that the connection members may be aligned at an ultrasonic welding position on the substrate and stood straight without being separated or fell down. Accordingly, quality of ultrasonic bonding may be improved, the nodal point of the horn may be supported through the deflection prevention block so as to prevent the horn from being deflected, and thereby, the connection members may be uniformly bonded to the substrate.

Meanwhile, according to another embodiment of the present invention, a power module package for power converting apparatus to which the substrate 20 where the connection members 10 are ultrasonic welded by using the ultrasonic welding system above is applied is provided.

According to the present invention, the connection members installed on the waffle pack are picked, aligned at the center, and then re-picked so that the connection members may be aligned at an ultrasonic welding position on the substrate and stood straight without being separated or fell down. Accordingly, quality of ultrasonic bonding may be improved, the nodal point of the horn may be supported through the deflection prevention block so as to prevent the horn from being deflected, and thereby, the connection members may be uniformly bonded to the substrate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ultrasonic welding system comprising:
   a centering aligning unit which aligns and centers connection members to be ultrasonic welded onto a substrate;
   an ultrasonic welding part which ultrasonic welds and bonds the connection members aligned by the centering aligning unit onto the substrate; and
   a picker which picks the connection members to be transferred to the centering aligning unit and re-picks the connection members aligned by the centering aligning unit to be transferred to ultrasonic welding positions on the substrate fixed to the ultrasonic welding part,
   wherein the centering aligning unit comprises:
      a centering zone on which the connection member transferred by the picker is placed and fixed;
      a centering unit which aligns and centers the connection member on the centering zone; and
      a vacuum-formed hole which is formed at the middle of the centering zone to provide a negative pressure and to fix the connection member,
   wherein the centering unit comprises:
      a plurality of centering jaws which is spaced apart from each other by the same interval on a concentric circle so as to stroke back and forth toward the center of the centering zone;
      a centering block which comprises the centering zone in the middle at the upper part thereof and guides the stroke of the centering jaws back and forth;
      a first cylinder which is combined to one side of the centering block and strokes each centering jaw forward; and
      a second cylinder which is combined to the other side of the centering block and strokes each centering jaw backwards.

2. The ultrasonic welding system of claim 1, further comprising a waffle pack on which the connection members are arranged in a specific form, wherein the picker separately picks the connection members from the waffle pack to be transferred to the centering aligning unit.

3. The ultrasonic welding system of claim 2, wherein the waffle pack comprises pockets manufactured to have a fixed depth arranged thereon in a matrix form in correspondence to the form of the connection members.

4. The ultrasonic welding system of claim 1, wherein the centering aligning unit further comprises a blower which sprays compressed air to the connection member placed on and fixed to the centering zone.

5. The ultrasonic welding system of claim 1, wherein the ultrasonic welding part comprises:
   a bonding block on which the substrate is placed on the upper part thereof;
   a clamp unit which fixes the substrate to the upper part of the bonding block; and
   an ultrasonic welding unit which ultrasonic welds the connection members placed on the substrate fixed by the clamp unit.

6. The ultrasonic welding system of claim 5, wherein the clamp unit further comprises clamps which are formed to face the upper part of the bonding block and to be lifted and descended so as to fix the substrate.

7. The ultrasonic welding system of claim 6, wherein the clamp unit comprises:
   a pair of clamps which fixes the substrate as the substrate is placed;
   LM guide rails which are extended in a vertical direction and each combined to the lower part of the clamp;
   LM guides which guide the LM guide rails to be lifted; and
   a third cylinder which lifts and descends the LM guides.

8. The ultrasonic welding system of claim 7, wherein the clamp further comprises pressure holes at the lower front end thereof which pressurize the upper surface of the substrate.

9. The ultrasonic welding system of claim 5, wherein the ultrasonic welding unit comprises:
   a housing which covers a booster to which ultrasonic vibration transmitted from a converter is applied; and
   a horn which comprises a pocket tool, wherein one side of the pocket tool is combined to the front end of the booster and the other side of the pocket tool is adhered to the upper surface of the connection member so that ultrasonic waves is transmitted to the connection members to be bonded.

10. The ultrasonic welding system of claim 9, wherein the ultrasonic welding unit further comprises a deflection prevention block which is combined to the upper part of the housing and presses and supports the upper part of the horn.

11. The ultrasonic welding system of claim 10, wherein the housing comprises a positioning block combined to the upper part thereof so as to adjust the position of the deflection prevention block.

12. The ultrasonic welding system of claim 9, wherein the other side of the pocket tool adhered to the upper surface of the connection member comprises a knurling pattern.

13. The ultrasonic welding system of claim 9, wherein the pocket tool comprises an engraved hole having a specific structure at the lower surface thereof to which the connection member is inserted.

14. The ultrasonic welding system of claim 13, wherein the engraved hole comprises one or more holes penetrated and formed thereon and the holes vacuum adsorb one surface of the connection member by a negative pressure.

15. The ultrasonic welding system of claim 9, wherein the picker comprises:
   a pair of jaws which respectively presses both sides of the connection member;
   a fourth cylinder which respectively controls opening and closing of the jaws; and
   an operating unit which moves a picker body to which the jaws are combined in a triaxial direction.

16. The ultrasonic welding system of claim 15, wherein the jaw is bent in an L-letter form in correspondence to the form of the pocket tool.

17. The ultrasonic welding system of claim 1, wherein the height of the connection member is longer than a horizontal length or a vertical length of a surface on the substrate to which the connection member is ultrasonic welded.

18. An ultrasonic welding system comprising:
   a centering aligning unit which aligns and centers connection members to be ultrasonic welded onto a substrate;
   an ultrasonic welding part which ultrasonic welds and bonds the connection members aligned by the centering aligning unit onto the substrate; and
   a picker which picks the connection members to be transferred to the centering aligning unit and re-picks the connection members aligned by the centering aligning unit to be transferred to ultrasonic welding positions on the substrate fixed to the ultrasonic welding part,
   wherein the ultrasonic welding part comprises:

a bonding block on which the substrate is placed on the upper part thereof;
a clamp unit which fixes the substrate to the upper part of the bonding block; and
an ultrasonic welding unit which ultrasonic welds the connection members placed on the substrate fixed by the clamp unit,
wherein the ultrasonic welding unit comprises:
a housing which covers a booster to which ultrasonic vibration transmitted from a converter is applied; and
a horn which comprises a pocket tool, wherein one side of the pocket tool is combined to the front end of the booster and the other side of the pocket tool is adhered to the upper surface of the connection member so that ultrasonic waves is transmitted to the connection members to be bonded.

\* \* \* \* \*